US008587691B2

(12) United States Patent
Takane

(10) Patent No.: US 8,587,691 B2
(45) Date of Patent: Nov. 19, 2013

(54) PHOTOGRAPHING APPARATUS AND METHOD FOR DYNAMIC RANGE ADJUSTMENT AND STEREOGRAPHY

(75) Inventor: Yasuo Takane, Yokohama (JP)

(73) Assignee: Samsung Electronics Co., Ltd., Suwon-si (KR)

(*) Notice: Subject to any disclaimer, the term of this patent is extended or adjusted under 35 U.S.C. 154(b) by 811 days.

(21) Appl. No.: 12/625,776

(22) Filed: Nov. 25, 2009

(65) Prior Publication Data

US 2010/0134652 A1 Jun. 3, 2010

(30) Foreign Application Priority Data

Nov. 28, 2008 (JP) ................. 2008-303837

(51) Int. Cl.
*H04N 5/235* (2006.01)
*H04N 13/00* (2006.01)
*H04N 5/225* (2006.01)
*G03B 7/00* (2006.01)
*G06K 9/32* (2006.01)

(52) U.S. Cl.
USPC .......... 348/229.1; 348/42; 348/262; 348/362; 382/294

(58) Field of Classification Search
USPC ................. 348/229.1, 262; 382/294
See application file for complete search history.

(56) References Cited

U.S. PATENT DOCUMENTS

| 7,561,731 | B2 * | 7/2009 | Wallace et al. ............... 382/154 |
| 8,045,792 | B2 * | 10/2011 | Koo et al. .................... 382/154 |
| 2005/0046738 | A1 | 3/2005 | Sato |
| 2006/0140510 | A1 * | 6/2006 | Wallace et al. ............... 382/294 |
| 2007/0046809 | A1 | 3/2007 | Nakamura |
| 2008/0063294 | A1 * | 3/2008 | Burt et al. ..................... 382/255 |
| 2008/0218612 | A1 * | 9/2008 | Border et al. ................. 348/262 |
| 2008/0239129 | A1 | 10/2008 | Oshima et al. |

FOREIGN PATENT DOCUMENTS

| JP | 2003-018617 A | 1/2003 |
| JP | 2004-135074 A | 4/2004 |
| JP | 2005-072963 A | 3/2005 |
| JP | 2007-067574 A | 3/2007 |
| JP | 2007-104408 A | 4/2007 |
| JP | 2007-288245 A | 11/2007 |
| JP | 2008-252790 A | 10/2008 |

OTHER PUBLICATIONS

Office Action established for JP 2008-303837 (Jun. 19, 2012).
Notice of Allowance issued for JP 2008-303837 (Feb. 26, 2013).

* cited by examiner

*Primary Examiner* — James M Hannett
*Assistant Examiner* — Quang Le
(74) *Attorney, Agent, or Firm* — Drinker Biddle & Reath LLP

(57) ABSTRACT

A photographing apparatus and method for dynamic range adjustment and stereography. The photographing apparatus includes a first imaging device for converting a light of a subject received through a first optical system into an electric signal; a second imaging device for converting a light of the subject received through a second optical system into an electric signal; a first image signal processor for generating an image signal for live view based on the electric signal output from the first imaging device before a photographing operation of a still image; an exposure controller for controlling an exposure so as to perform a step exposure in the second imaging device before the photographing of the still image; and an exposure calculator for calculating an exposure amount in the photographing operation of the still image based on the electric signal converted in the second imaging device obtained through the step exposure.

15 Claims, 7 Drawing Sheets

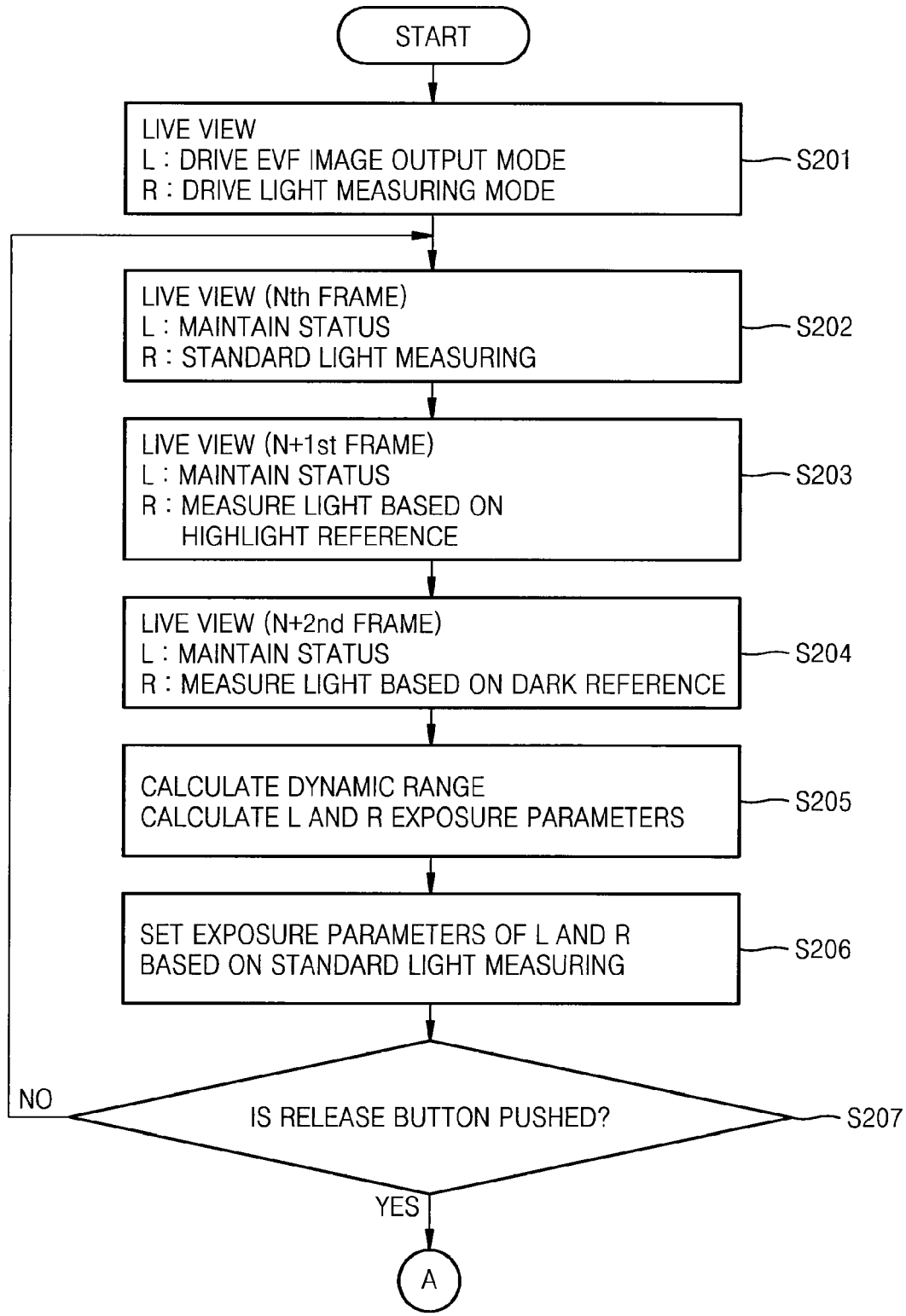

PHOTOGRAPHING APPARATUS AND METHOD FOR DYNAMIC RANGE ADJUSTMENT AND STEREOGRAPHY

CROSS-REFERENCE TO RELATED PATENT APPLICATION

This application claims the benefit of Japanese Patent Application No. 2008-303837, filed on Nov. 28, 2008, in the Japanese Intellectual Property Office, the disclosure of which is incorporated herein in its entirety by reference.

BACKGROUND

The present invention relates to a photographing apparatus and method for dynamic range adjustment and stereography.

In scenes captured by a photographing apparatus such as a digital still camera or a video camera, there may be a wide brightness ratio between the brightest portion and the darkest portion of a subject. This ratio of brightest to darkest is also called the dynamic range of the image.

When photographing of the subject is performed using a photographing apparatus having a narrow allowable dynamic range, the subject may not be photographed well. At this time, since the photographing apparatus is not in an appropriate exposure state, the captured image may include dark or bright smeared portions.

When the subject is photographed by a photographing apparatus having a narrow allowable dynamic range, the dynamic range may be enlarged using the following operations. For example, the dynamic range may be enlarged by (1) non-linear treatment such as gamma or knee operation, (2) using a non-linear photographing apparatus, (3) combining images obtained from imaging devices having properties different from each other, or (4) image signal processing or combining images obtained from one imaging device.

However, since the dynamic range of original image data input into the photographing apparatus is narrow, there is a limitation in enlarging the dynamic range using the operations (1) through (4) mentioned above.

In addition, according to a conventional method of enlarging a dynamic range by combining a plurality of images, exposures of which are different from each other, images captured at different times from each other may be combined. Thus, it is difficult to combine images obtained by photographing a moving subject or captured during a hand-shake to produce an image having high image quality. In addition, in the above case, each of the images may be captured after changing exposure, and thus, brightness of an electronic view finder (EVF) or a liquid crystal display (LCD) in the live view display may be repeatedly changed between dark and bright states, or continuity of displaying the subject in the live view display may not be ensured.

SUMMARY

The present invention provides a photographing apparatus and method, in which an exposure amount required to successfully perform a main photographing operation for a still image is ensured while displaying a moving picture image stably before the main photographing operation for the still image.

According to an aspect of the present invention, there is provided a photographing apparatus including: a first imaging device for converting light from a subject received through a first optical system into an electric signal; a second imaging device for converting light from the subject received through a second optical system into an electric signal; a first image signal processor for generating an image signal for a live view based on the electric signal output from the first imaging device before a photographing operation of a still image; an exposure controller for controlling an exposure so as to perform a step exposure in the second imaging device before the photographing of the still image; and an exposure calculator for calculating an exposure amount during the photographing operation of the still image based on the electric signal converted in the second imaging device obtained through the step exposure.

The photographing apparatus may further include: an exposure amount setting unit for setting an exposure amount of the first or second imaging device based on highlight reference and an exposure amount of the other imaging devices based on dark reference at the same time based on the calculated exposure amount; and a second image processor for generating a first image signal for a still image based on the electric signal converted by the first imaging device and a second image signal for a still image based on the electric signal converted by the second imaging device at the same time when the photographing operation of the still image is performed based on the set exposure amount.

The photographing apparatus may further include: a dislocation detector for detecting a dislocation between the first and second image signals; and a combining unit for combining the first and second image signals with each other using the detected dislocation.

The photographing apparatus may further include: an exposure amount setting unit for setting exposure amounts of the first and second imaging devices to be the same as each other at the same timing based on the calculated exposure amount; and a second image processor for generating a first image signal for a still image based on the electric signal converted by the first imaging device and a second image signal for a still image based on the electric signal converted by the second imaging device at the same time when the photographing operation of the still image is performed based on the set exposure amount.

The photographing apparatus may further include: a dislocation detector for detecting a dislocation between the first and second image signals; and a combining unit for combining the first and second image signals with each other using the detected dislocation.

According to another aspect of the present invention, there is provided a photographing method including: converting light from a subject received through a first optical system into an electric signal by a first imaging device; converting light from the subject received through a second optical system into an electric signal by a second imaging device; generating an image signal for a live view based on the electric signal converted by the first imaging device before a photographing operation of a still image; controlling an exposure to be a step exposure in the second imaging device before the photographing operation of the still image; and calculating an exposure amount required in the photographing operation of the still image based on the electric signal converted by the second imaging device, which is obtained by the step exposure.

BRIEF DESCRIPTION OF THE DRAWINGS

The above and other features and advantages of the present invention will become more apparent by describing in detail exemplary embodiments thereof with reference to the attached drawings in which:

FIGS. 4A and 4B are flowcharts illustrating operations of the photographing apparatus of FIG. 1 in a stereo image photographing mode, according to an embodiment of the present invention.

DETAILED DESCRIPTION OF THE EMBODIMENTS

Figure 1:
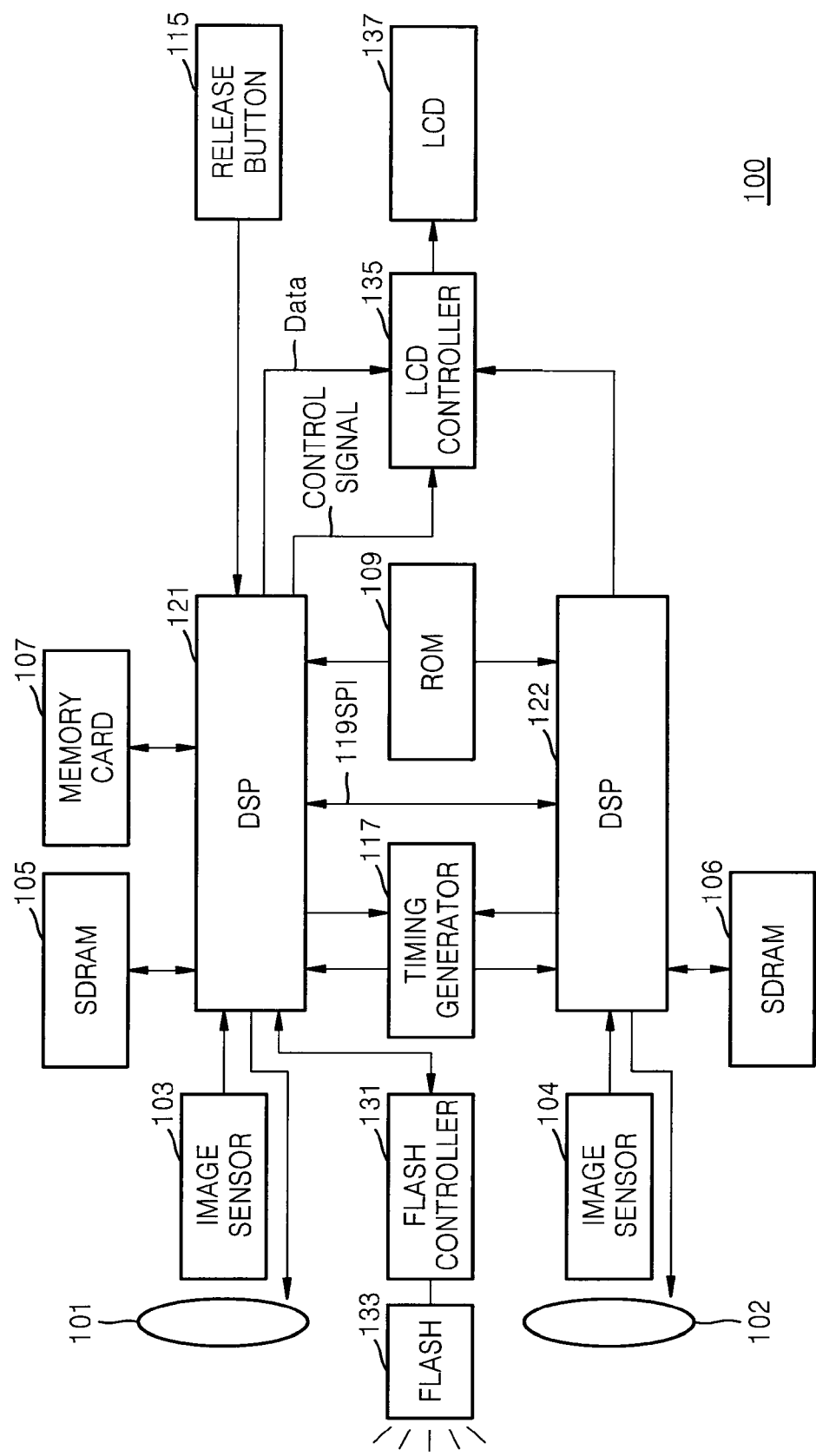
FIG. 1 is a block diagram of a photographing apparatus according to an embodiment of the present invention.

Hereinafter, the present invention will be described in detail by explaining embodiments of the invention with reference to the attached drawings. Like reference numerals in the drawings denote like elements.

A photographing apparatus 100 according to an embodiment of the present invention will be described as follows.

FIG. 1 is a block diagram of the photographing apparatus 100 according to the embodiment of the present invention.

The photographing apparatus 100 includes two photographing systems each of which including an optical system and an imaging system, and each of the photographing systems may separately photograph a subject to obtain an image. For example, when a live view image is displayed, an image displayed as the live view image may be obtained through one photographing system, and the other photographing system may measure light. Otherwise, the photographing systems may be arranged parallel to each other to photograph the subject at the same time, and thus, a stereo image (a three-dimensional image) may be generated.

The photographing apparatus 100 includes optical systems 101 and 102, image sensors 103 and 104, synchronous random access memories (SDRAMs) 105 and 106, a memory card 107, a read only memory 109, a release button 115, a timing generator 117, digital signal processors 121 and 122, a flash controller 131, a flash 133, a liquid crystal display (LCD) controller 135, and an LCD 137.

The optical systems 101 and 102 are respectively examples of a first optical system and a second optical system. The optical systems 101 and 102 form image of external light on the image sensors 103 and 104, respectively transmitting light from the subject toward the image sensors 103 and 104. The light from the optical system 101 reaches the image sensor 103, and the light from the optical system 102 reaches the image sensor 104.

Each of the optical systems 101 and 102 may include a zoom lens, a diaphragm, and a focusing lens. The zoom lens changes a viewing angle by changing a focal length, and the diaphragm adjusts an amount of the light transmitting therethrough. The focusing lens focuses an image of the subject on an imaging surface of the image sensor 103 or 104 by moving from a side to another side, or vice versa.

The image sensors 103 and 104 are examples of a first imaging device and a second imaging device (photoelectric conversion device), and may include photoelectric conversion devices that convert optical information incident from the optical systems 101 and 102 into electric signals. The image sensors 103 and 104 may generate the electric signals according to the received light.

Charge coupled device (CCD) sensors or complementary metal oxide semiconductor (CMOS) sensors may be used as the image sensors 103 and 104.

In addition, a mechanical shutter (not shown) that may block light when photographing is not performed and may transmit light when photographing is performed may be used to control exposure times of the image sensors 103 and 104. However, the present invention is not limited thereto, that is, an electronic shutter (not shown) may be used. In addition, the mechanical shutter or the electronic shutter may be operated by a switch connected to the DSPs 121 and 122, such as the release button 115 (a manipulation member).

Each of the image sensors 103 and 104 respectively further includes a correlated double sampler (CDS)/amplifier (AMP), and an analog/digital (A/D) converter.

The CDS/AMP removes low-frequency noise included in the electric signal output from the image sensors 103 and 104, and at the same time, each may amplify a respective electric signal to a predetermined level.

The A/D converter converts the electric signal output from the CDS/AMP into a digital signal. The A/D converter outputs the digital signal to an image signal processor 141.

The SDRAMs 105 and 106 temporarily store image data of captured images. The SDRAMs 105 and 106 may store image data of a plurality of images. In addition, the SDRAMs 105 and 106 are respectively connected to the DSPs 121 and 122. Reading/writing of image data from/to the SDRAMs 105 and 106 are controlled by a memory controller 151.

In addition, the SDRAM 105 may include a region as video RAM (VRAM). The VRAM may be used for displaying images, and may include a plurality of channels. The VRAMs may simultaneously perform operations of inputting image data therein and outputting image data to the LCD controller 135. A definition or a maximum color representation number may depend on a capacity of the VRAM.

The memory card 107 may include a semiconductor memory medium such as a flash memory. Image data generated by a photographing operation is recorded in the memory card 107 or is read from the memory card 107. In addition, the memory card 107 is not limited to the flash memory, but may include an optical disc (a compact disc (CD), a digital versatile disc (DVD), or a blue-ray disc), a photomagnetic disc, or a magnetic disc. The memory card 107 may be detachable from the photographing apparatus 100.

The ROM 109 stores an operating program for the DSPs 121 and 122.

The release button 115 may operate in a half-pushed state, a fully-pushed state, and a released state. The release button 115 outputs a manipulation signal for starting focusing control when the release button 115 is half-pushed (S1 operation). When the half-pushed state is released, the focusing control is stopped. In addition, the release button 115 outputs a manipulation signal for starting a photographing operation when the release button 115 is fully-pushed (S2 operation).

In addition, the photographing apparatus 100 may include a manipulation member (not shown) in addition to the release button 115. The manipulation member may be, for example, up, down, left, and right keys, a power switch, or a mode dial. The manipulation member transmits a manipulation signal to the DSPs 121 and 122 based on a user's manipulation.

The timing generator 117 outputs a timing signal to the image sensors 103 and 104 or to the CDS/AMP to control an exposure time of pixels in the image sensors 103 and 104 and reading of electric charges.

The DSPs 121 and 122 may be examples of a first image signal processor and a second image signal processor, and may perform as a calculating device and a controlling device according to a program. The DSPs 121 and 122 control processes of components installed in the photographing apparatus 100.

The DSPs 121 and 122 drive the optical systems 101 and 102 by outputting a signal to a driver (not shown) based on the focusing control or the exposure control. In addition, the DSPs 121 and 122 control the components installed in the photographing apparatus 100 based on a signal transmitted from the manipulation member (not shown). In addition, according to the present embodiment, the DSPs 121 and 122 are respectively formed in each photographing system as shown in FIG. 1. The DSPs 121 and 122 are separately formed in order to execute signal-based commands and manipulation-based commands separately.

Figure 5:
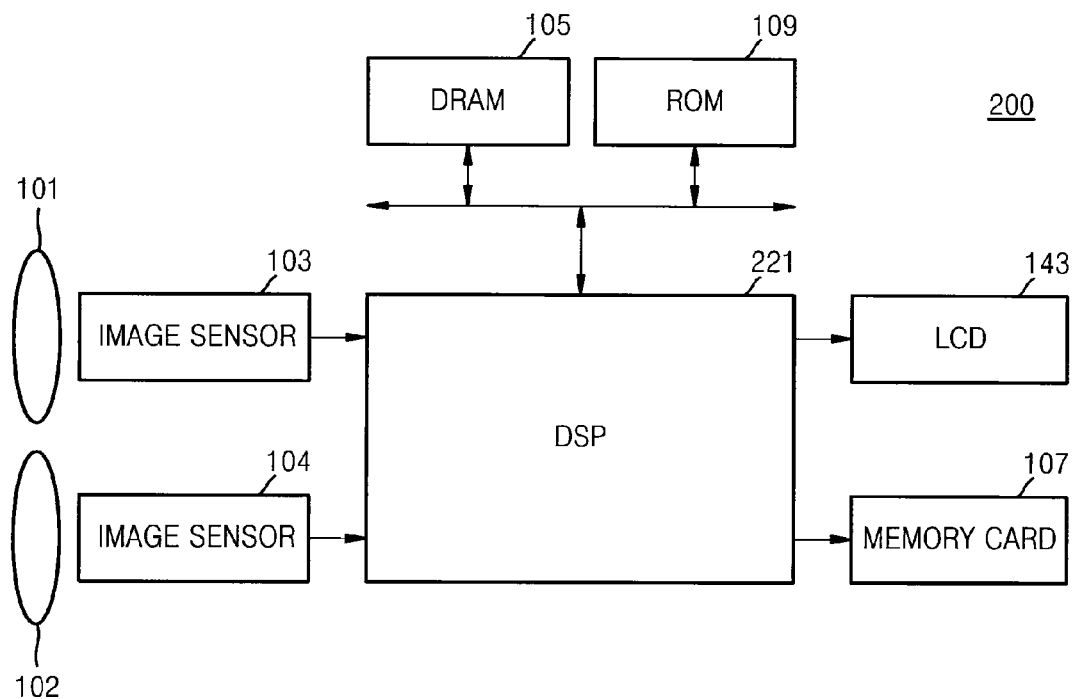
FIG. 5 is a block diagram of a photographing apparatus according to another embodiment of the present invention.

The photographing apparatus 100 of the present embodiment includes the two DSPs 121 and 122, however, the present invention is not limited thereto. For example, as shown in FIG. 5, the photographing apparatus of the present invention may include one DSP 221. FIG. 5 is a block diagram of a photographing apparatus 200 according to another embodiment of the present invention. That is, as shown in FIG. 5, the one DSP 221 performs the signal-based commands and the manipulation-based commands in the photographing apparatus 200. Components of the photographing apparatus 200 other than the DSP 221 are the same as those of the photographing apparatus 100 shown in FIG. 1, and thus, detailed descriptions of those components are not provided here.

The flash controller 131 generates a control signal based on a signal transmitted from the DSP 121, and transmits the generated signal to the flash 133. The flash irradiates light onto the subject during a main photographing operation and during controlling of the focus before a main photographing operation.

The LCD controller 135 receives image data from, for example, an encoder LCD controller 163, and displays the image data on the LCD 137. The LCD 137 is installed in a main body of the photographing apparatus 100.

The images displayed on the LCD 137 may include an image read from the SDRAM 105 before the photographing (live view), various setting images of the photographing apparatus 100, and captured and recorded images. In the present embodiment, the LCD 137 is used as a display unit and the LCD controller 135 is used as a display driving unit, however, the present invention is not limited thereto. Instead, an organic electroluminescence (EL) display may be used as the display unit, and an organic EL controller may be used as the display driving unit.

Figure 2:
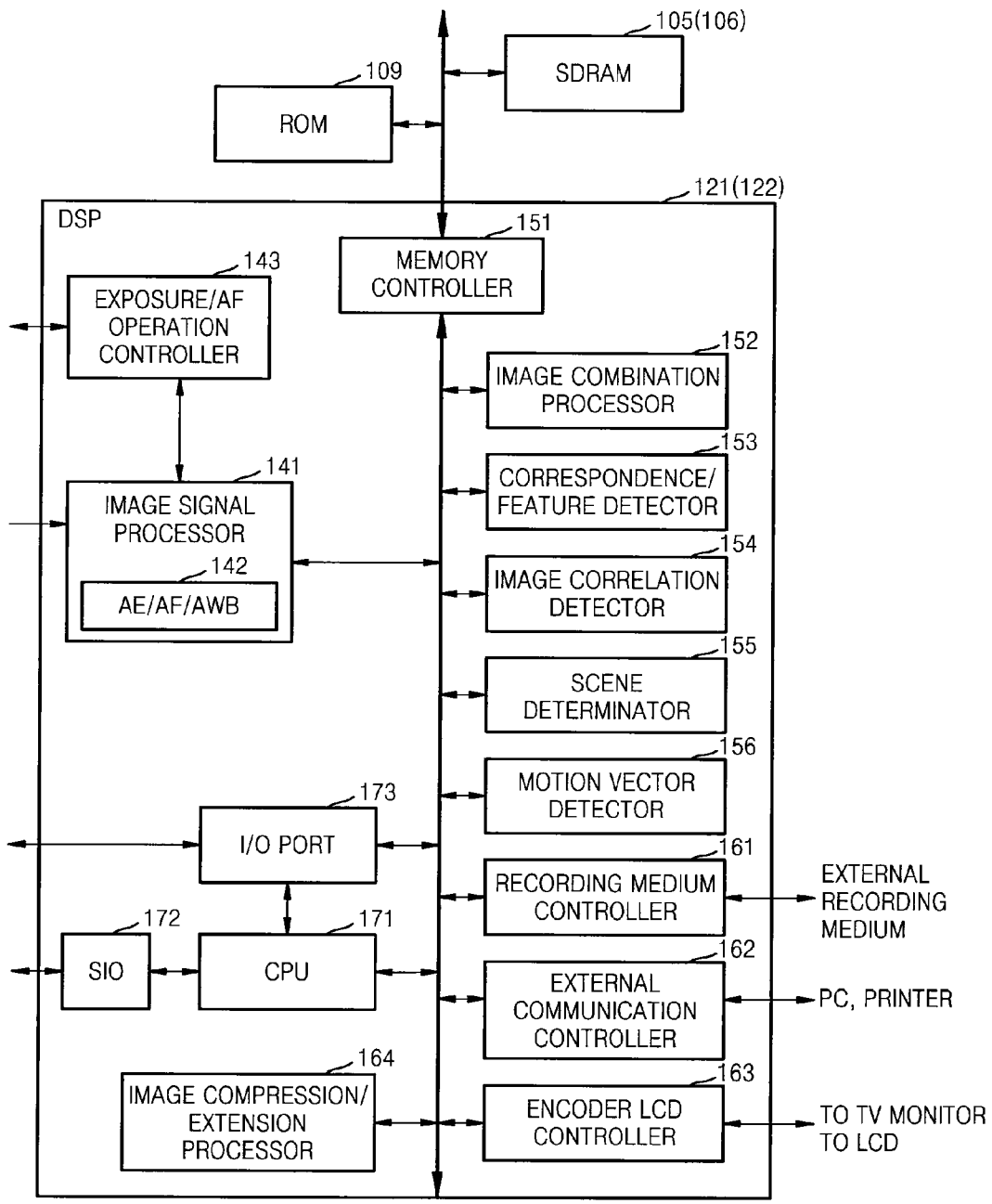
FIG. 2 is a block diagram of a digital signal processor (DSP) in the photographing apparatus of FIG. 1, according to an embodiment of the present invention.

Next, the DSPs 121 and 122 of the photographing apparatus 100 according to the present embodiment will be described as follows. FIG. 2 is a block diagram of the DSPs 121 and 122 in the photographing apparatus 100, according to an embodiment of the present invention.

Each of the DSPs 121 and 122 includes an image signal processor 141, an auto exposure (AE)/auto focusing (AF)/auto white balance (AWB) calculator 142, an exposure/AF operation controller 143, the memory controller 151, an image combining processor 152, a correspondence/feature detector 153, an image correlation detector 154, a scene determiner 155, a motion vector detector 156, a recording medium controller 161, an external communication controller 162, the encoder LCD controller 163, an image compression/extension processor 164, a central processing unit (CPU) 171, a serial input/output (SIO) 172, and an input/output (I/O) port 173.

The image signal processor 141 receives the digital signal output from the A/D converter of the image sensors 103 and 104 and performs image processing and generates an image signal. The image signal processor 141 processes the image signal based on a white balance (WB) control value, aγ value, and a contour emphasizing control value. In addition, the image signal processor 141 calculates an AE evaluation value, an AWB evaluation value, and an AF evaluation value based on the image signal.

The AE/AF/AWB calculator 142 calculates a diaphragm amount or a shutter speed based on the AE evaluation value calculated by the image signal processor 141. The AE/AF/AWB calculator 142 calculates color signal gains of, for example, three primitive colors, based on the AWB evaluation value calculated by the image signal processor 141. The AE evaluation value and the AWB evaluation value are calculated by the image signal processor 141 based on brightness of the image signal. The image signal processor 141 or the AE/AF/AWB calculator 142 may be an example of an exposure amount calculator.

The exposure/AF operation controller 143 outputs the diaphragm amount calculated by the AE/AF/AWB calculator 142 to the driver (not shown) of the optical system 101 as a control signal. The driver generates a driving signal based on the control signal transmitted from the exposure/AF operation controller 143. The exposure/AF operation controller 143 controls exposure time, gain, and reading mode of the image sensors 103 and 104. The gain is used to calculate a contrast value. Here, the reading mode of the image sensors 103 and 104 denotes a signal processing mode for when image data is read from the image sensors 103 and 104. That is, when the image of the subject is dark, addition of pixels is performed, or when the image of the subject is bright, the pixels in the image are read as they are. The exposure/AF operation controller 143 may be an example of an exposure controller and an exposure amount setting unit.

In addition, when a command signal for starting the focusing control is received, the exposure/AF operation controller 143 generates a control signal for moving the focusing lens to a side and outputs the control signal to the driver (not shown). The exposure/AF operation controller 143 calculates an in-focus location of the focusing lens based on the AF evaluation value calculated by the image signal processor 141. The AF evaluation value may be a contrast value of the image, and thus, it is determined that the image of the subject is in the in-focus state on the imaging surfaces of the image sensors 103 and 104 when the contrast value is a maximum (contrast detection).

The memory controller 151 controls reading/writing of the image data from/into the SDRAMs 105 and 106. Here, DRAMs may be used instead of the SDRAMs 105 and 106.

The image combination processor 152 may be an example of a dislocation detecting and combining unit, and may combine two images captured by the image sensors 103 and 104 at the same time or at different times. Here, a dislocation amount between the images is detected, and the image combination processor 152 combines the images based on the dislocation amount.

The correspondence/feature detector 153 extracts feature points from image frames, and detects correspondences between frames to compare the images with each other or to trace the correspondences.

The image correlation detector 154 calculates correlation between the image frames. The image correlation detector 154 makes a correspondence between the images when a few feature points are detected by the correspondence/feature detector 153 or there is no correspondence between the image frames.

The scene detector 155 determines whether the photographing scene is about, for example, scenery, persons, or sports, from the detecting result of the correspondence/feature detector 153 or the image correlation detector 154.

The recording medium controller 161 controls writing of the image data into the memory card 107, or reading of the image data or setting information stored in the memory card 107.

The external communication controller 162 transmits/receives signals to/from an external device such as a personal computer or a printer.

The encoder LCD controller 163 encodes image data to generate image data that may be displayed on the LCD 137.

The image compression/extension processor 164 compresses the image signal into a joint photographic experts group (JPEG) format or a motion picture experts group (MPEG) format. Then, the image compression/extension processor 164 transmits the compressed image data to the recording medium controller 161.

The CPU 171 may be a calculator and controller for the DSPs 121 and 122. The CPU 171 sends/receives signals to/from outside via the SIO 172 or the I/O port 173.

In addition, the photographing apparatus 100 may perform a series of processes according to hardware or software such as a computer program.

As described above, the photographing apparatus 100 according to the present embodiment includes two photographing systems; however, the present invention is not limited thereto. For example, the photographing apparatus of the present invention may include three or more photographing systems. The photographing apparatus 100 according to the present embodiment may obtain images at the same time or at different times by using a plurality of photographing systems.

In addition, the photographing apparatus 100 according to the present embodiment includes a functional block having a function of calculating correlation between obtained images, a functional block having a function of recognizing objects (pattern matching) by extracting image frames including certain shapes, and a functional block having an algorithm of determining the photographing scene from the recognition result. In addition, the photographing apparatus 100 of the present embodiment may perform both general image capturing sequences and stereo image capturing sequences.

Operations of the photographing apparatus 100 according to the present embodiment will be described as follows.

In the photographing apparatus 100, two images are captured at the same time using different exposure parameters from each other and are combined by using two photographing systems. In addition, in a mode of outputting a two-dimensional image, a dynamic range of the image may be enlarged by combining the images.

Moreover, in a mode of outputting a stereo (three-dimensional) image, a main photographing operation is performed by applying a standard value of measured light as an exposure parameter to each of the photographing systems. The image data is recorded in the recording medium in a stereo image format in a stereo image capturing mode.

In addition, when the live view is displayed before a main photographing operation, one of the photographing systems mainly operates to output the live view image on the LCD 137, and the other photographing system mainly operates to measure light for the main photographing operation.

[Dynamic Range Enlarging Mode]

Figure 3A:
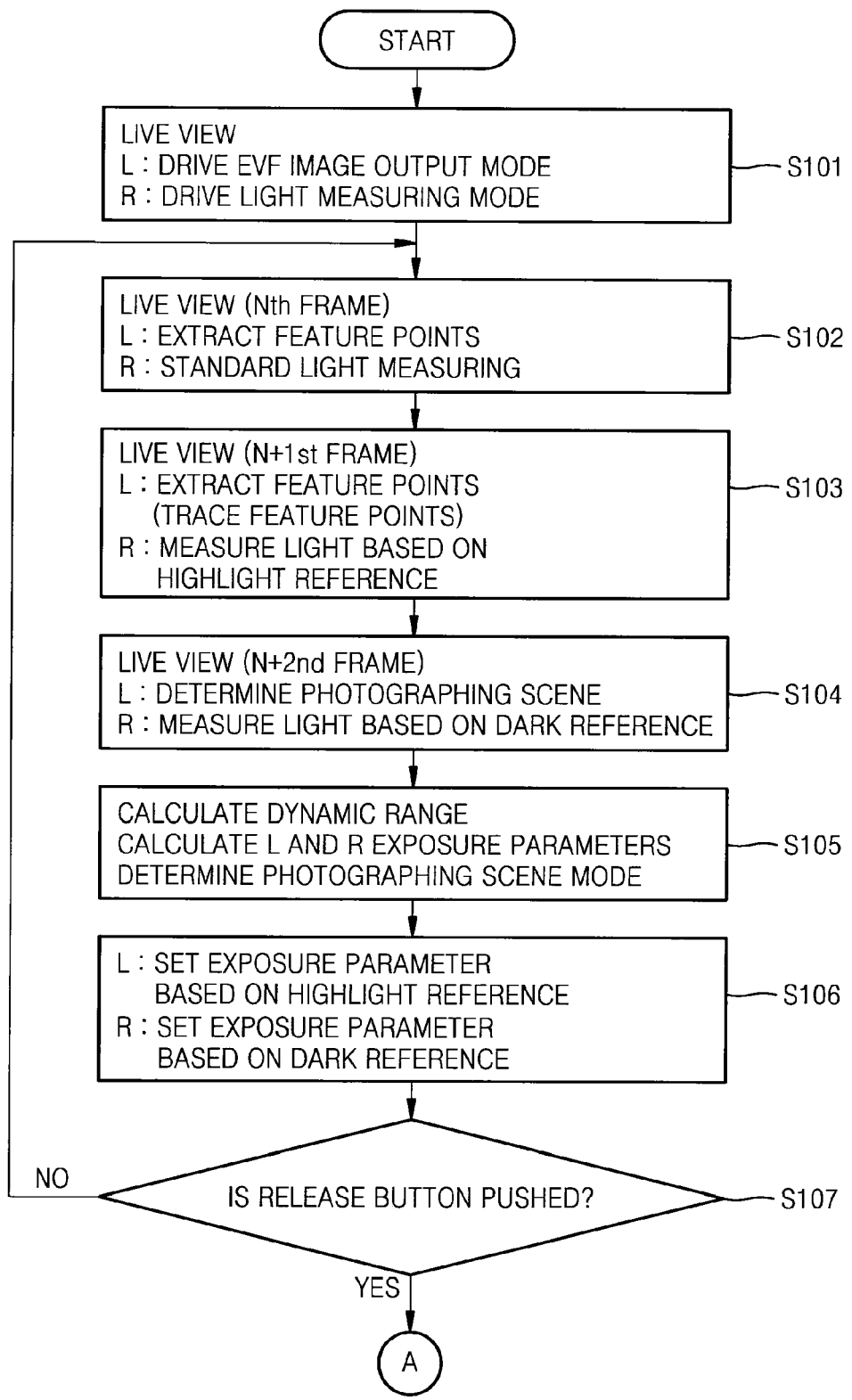
FIGS. 3A and 3B are flowcharts illustrating operations of the photographing apparatus of FIG. 1 in a dynamic range enlarging mode, according to an embodiment of the present invention.
Figure 3B:
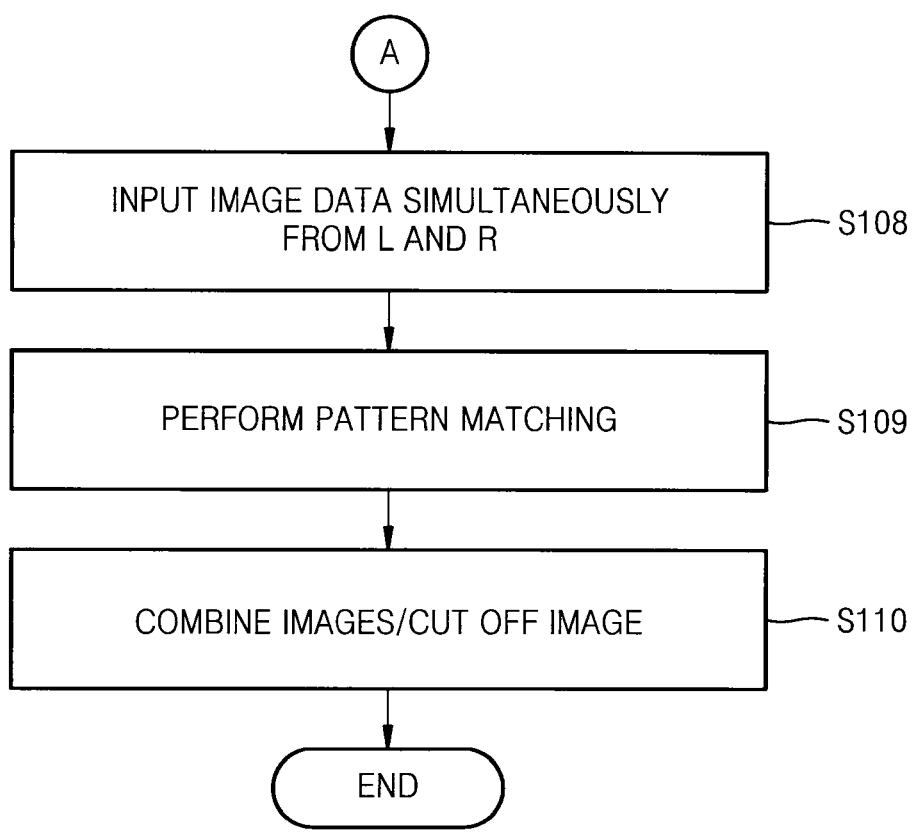

Next, a case where the photographing apparatus 100 is used in a dynamic range enlarging mode will be described. FIGS. 3A and 3B are flowcharts illustrating operations of the photographing apparatus 100 in the dynamic range enlarging mode, according to an embodiment of the present invention.

Here, after displaying the live view of the subject on the LCD 137, a main photographing operation is performed when the release button 115 is fully-pushed. In addition, in FIGS. 3A and 3B, L denotes a left photographing system of the photographing apparatus 100 (hereinafter, referred to as an L system), and R denotes a right photographing system of the photographing apparatus 100 (hereinafter, referred to as an R system). Both of the two photographing systems may have the same performances, such as the definition as each other.

First, the L system drives an electronic view finder (EVF) in an image outputting mode, and starts displaying the live view on the LCD 137 (operation S101). The R system drives the light measuring mode, and starts the light measuring operation by using the image sensor of the R system (operation S101). Here, a frame rate of the R system is set to be equal to that of the L system or higher. Thus, the exposure amount of the EVF may be set according to a reference light value measured by the R system.

Next, the L system extracts feature points from, for example, an nth frame image (operation S102). Meanwhile, the R system calculates a histogram from a standard light measuring result of the n-th frame image (operation S102).

In addition, the L system extracts feature points from an (n+1)th frame image, and traces the feature points by comparing the feature points extracted from the (n+1)th frame with the feature points extracted in the operation S102 (operation S103). Meanwhile, the R system calculates a histogram from a light measuring result based on a highlight reference in the (n+1)th frame image (operation S103).

Then, the L system determines the photographing scene from the extracted feature points or the tracing result of the feature points (operation S104). For example, the L system determines whether the photographing scene coincides with the photographing scenes such as scenery, persons, or sports stored in the photographing apparatus 100 in advance, and outputs the determination of the photographing scene when there is a corresponding scene in the photographing apparatus 100. Thus, a photographing mode corresponding to the scene may be determined for the main photographing operation, and photographing operations suitable for the scene may be performed accordingly. The L system may perform a face recognition process in an (n+2)th frame image by using the extracted feature points or the tracing result of the feature points.

On the other hand, the R system calculates a histogram from a light measuring result based on dark reference (based on shadow reference) from the (n+2)th frame image (operation S104).

Next, the dynamic range of the main photographing operation is calculated based on the histograms of the standard light measuring, the highlight-based light measuring, and the dark-based light measuring, which are calculated by the R system, and then the exposure parameters for the L and R systems in the main photographing operation may be calculated. In addition, the photographing mode of the main photographing operation corresponding to the determined scene is determined (operation S105).

In addition, the L system sets the exposure parameter calculated based on the highlight reference, and the R system sets the exposure parameter calculated based on the dark reference (operation S106). Therefore, the image captured in the main photographing operation may have a wider dynamic range than that of an image captured using only one imaging device.

In addition, it is determined whether the release button 115 is in a pressed state when the exposure parameters are set (operation S107). When the release button 115 is determined to be in the pressed state, the process goes to operation S108. Otherwise, the operations S102 through S106 are repeated to reset the light measuring and the exposure parameters until the release button 115 is determined to be in the pressed stated.

When the release button 115 is determined to be in a pressed state, the image data captured based on the highlight reference by the L system and the image data captured based on the dark reference by the R system are simultaneously input into the image signal processor 141 (operation S108).

Next, the image correlation detector 154 performs a pattern matching operation of the image data obtained through the L and R systems (operation S109). In more detail, the image correlation detector 154 calculates a correlation between the two images to detect a dislocation between the two images.

In addition, the image captured based on the highlight reference by the L system and the image captured based on the dark reference by the R system are combined with each other (operation S110). At this time, the two images are combined, removing the dislocation therebetween, and thus, a clear image may be obtained. If necessary, portions of the combined image not required are cut off (operation S111).

Since the L and R systems are located at different angles with respect to the same subject, the images obtained by the L and R systems are slightly different from each other even when the L and R systems are close to each other. Therefore, when the images are combined, removing the detected dislocation between the images by correlation calculation, a general flat image may be obtained even when the images obtained by the L and R systems are slightly different from each other. In addition, according to the present embodiment, images captured at different exposure parameters are obtained simultaneously, and an image having a wide dynamic range may be obtained by the combination of the captured images.

In addition, one of the two photographing systems mainly operates to output the image to the LCD 137, and the other photographing system mainly performs the light measuring for the main photographing operation. Therefore, unlike the case where the live view image is obtained and performing the light measuring is performed using only one photographing system, an image exclusively for the live view may be obtained separately. Thus, repetition of brightness and darkness in the image and discontinuity in displaying the live view of the subject that may be caused by the light measuring operation may be prevented.

In addition, in the above description, the L and R systems have the same definition as each other, however, they may have different definitions from each other provided that the qualities of the images obtained from the L and R systems become the same through image processing. In addition, the R system performs the light measuring in an order of the standard light measuring, the light measuring based on highlight reference, and the light measuring based on the dark reference, however, the present invention is not limited thereto.

[Stereo Image Capturing Mode]

Next, the photographing apparatus 100 operating in the stereo image capturing mode will be described as follows.

Figure 4B:
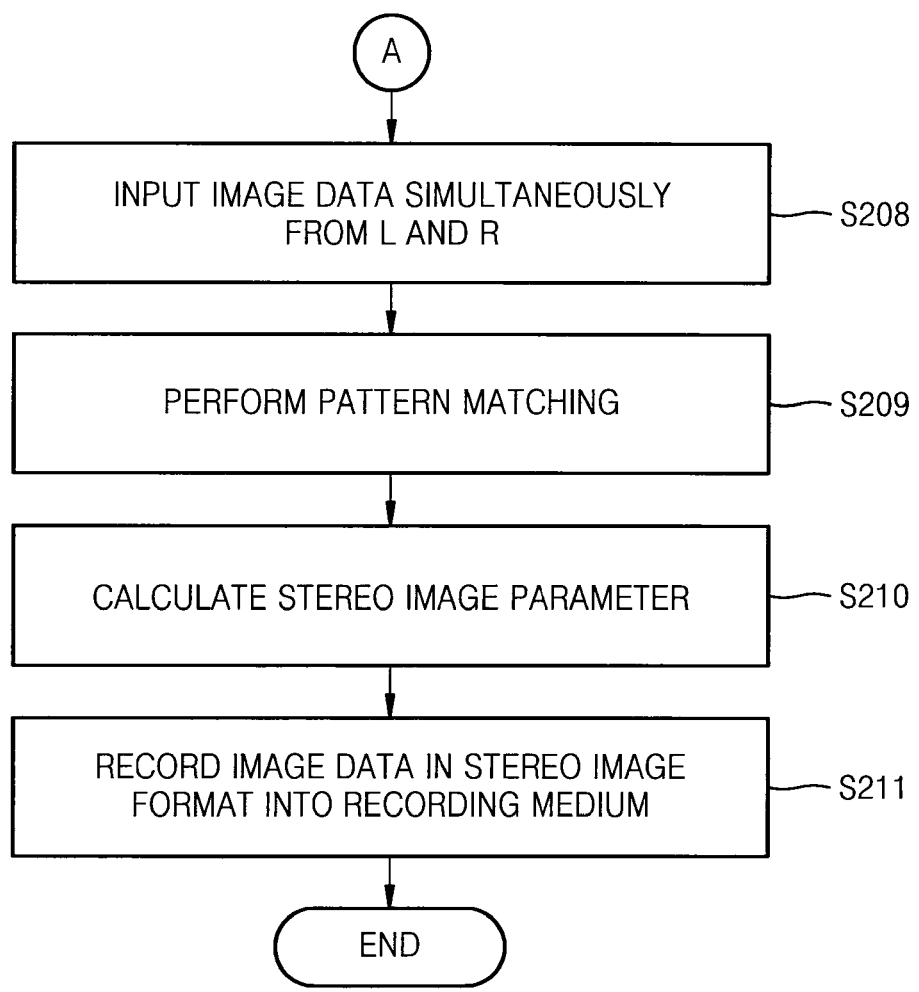

FIGS. 4A and 4B are flowcharts illustrating operations of the photographing apparatus 100 in the stereo image capturing mode.

Here, after displaying the live view of the subject on the LCD 137, the photographing apparatus 100 performs a main photographing operation when the release button 115 is completely pushed.

In addition, as described with reference to FIGS. 3A and 3B, L denotes the left photographing system of the photographing apparatus 100 (hereinafter, referred to as an L system), and R denotes the right photographing system of the photographing apparatus 100 (hereinafter, referred to as an R system). Both of the two optical imaging systems may have the same performances, such as the same definition as each other.

First, the L system drives an EVF in an image outputting mode, and starts displaying the live view on the LCD 137 (operation S201).

The R system is driven in the light measuring mode, and starts the light measuring operation by using the image sensor of the R system (operation S201). Here, a frame rate of the R system is set to be equal to that of the L system or higher. Thus, the exposure amount of the EVF may be set according to a reference light value measured by the R system.

Next, the L system obtains an nth frame image, and displays the image as the live view on the LCD 137 (operation S202). Meanwhile, the R system calculates a histogram from a standard measuring result of the nth frame image (operation S202).

In addition, the L system obtains an (n+1)th frame image, and displays the obtained image as the live view on the LCD 137 (operation S203). Meanwhile, the R system calculates a histogram from a light measuring result based on highlight reference in the (n+1)th frame image (operation S203).

Next, the L system obtains an (n+2)th frame image, and displays the obtained image as the live view on the LCD 137 (operation S204). Meanwhile, the R system calculates a histogram from the light measuring result based on dark reference (based on shadow reference) from the (n+2)th frame image (operation S204).

Next, the dynamic range of the main photographing operation is calculated based on the histograms of the standard light measuring, the highlight-based light measuring, and the dark-based light measuring, which are calculated by the R system, and then the exposure parameters for the L and R systems in the main photographing operation may be calculated (operation S205).

In addition, the exposure parameters of the L and R systems are set by using the standard light measuring value (operation S206). However, the exposure parameter may be determined without using the standard light measuring value if the L and R systems have the same exposure value and the exposure parameter is suitable for both of the L and R systems. The exposure parameter for the main photographing operation may be set by the light measured by the R system. Otherwise, operations S202 through S206 may be omitted, and the exposure parameter may be set by using the standard light measuring value.

Next, it is determined whether the release button 115 is determined to be in a pressed state when the exposure parameter is set (operation S207). When the release button 115 is determined to be in the pressed state, the process goes to operation S208. Otherwise, the operations S202 through S206 are repeated to reset the light measuring and the exposure parameters until the release button 115 is determined to be in the pressed state.

When the release button 115 is determined to be in the pressed state, the image data captured by the L system and the image data captured by the R system are simultaneously input into the image signal processor 141 (operation S208).

Next, the image correlation detector 154 performs a pattern matching operation of the image data obtained through the L and R systems (operation S209). In more detail, the image correlation detector 154 calculates a correlation between the two images to detect a dislocation between the two images. In addition, a parameter for generating a stereo image may be calculated based on the two images captured by the R and L systems, the dislocation amount between the two images, and characteristics of the photographing apparatus 100 (operation S210).

Next, the image data and the parameter are recorded in the memory card 107 in the stereo image format (operation S211).

Since the L and R systems are located at different angles with respect to the same subject, images captured by the L and R systems are slightly different from each other. Therefore, the image correlation detector 154 detects the dislocation through the correlation calculation in order to calculate the parameter for generating the stereo image, and accordingly, the image data may be recorded in the memory card 107 in the stereo image format by which the stereo image may be reproduced.

In addition, one of the two photographing systems mainly operates to output the image to the LCD 137, and the other photographing system mainly performs the light measuring for the main photographing operation. Therefore, unlike the case where the live view image is obtained and the light measuring is performed using only one photographing system, an image exclusively for the live view may be obtained separately. Thus, repetition of brightness and darkness in the image and discontinuity in displaying the live view of the subject that may be caused by the light measuring operation may be prevented.

In addition, in the stereo image capturing mode, the main photographing is performed by using the standard light measuring value only; however, after starting the main photographing operation, the image data of a certain frame may be captured by the L and R systems simultaneously based on the highlight reference, and then, the image data of the next frame may be captured by the L and R systems simultaneously based on the dark reference. Then, in each of the L and R systems the image data based on the highlight reference and the image data based on the dark reference may be combined to generate an image having wide dynamic range.

According to the present invention, the moving picture may be stably displayed on an LCD before performing a main photographing operation of a still image, and an exposure amount required to perform the main photographing operation of the still image may be ensured.

While the present invention has been particularly shown and described with reference to exemplary embodiments thereof, it will be understood by those of ordinary skill in the art that various changes in form and details may be made therein without departing from the spirit and scope of the present invention as defined by the following claims.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A photographing apparatus comprising:
a first imaging device for converting light from a subject received through a first optical system into a first electric signal;
a second imaging device for converting light from the subject received through a second optical system into a second electric signal;
a first image signal processor for generating an image signal for a live view based on the first electric signal output from the first imaging device before a photographing operation of a still image;
an exposure controller for controlling an exposure so as to perform a step exposure in the second imaging device before the photographing of the still image;
an exposure calculator for calculating an exposure amount during the photographing operation of the still image based on the second electric signal converted in the second imaging device obtained through the step exposure;
an exposure amount setting unit for setting an exposure amount of the first or second imaging device based on a highlight reference and an exposure amount of the other imaging devices based on a dark reference at the same time based on the calculated exposure amount; and
a second image processor for generating a first image signal for a still image based on the first electric signal converted by the first imaging device and a second image signal for a still image based on the second electric signal converted by the second imaging device at the same time when the photographing operation of the still image is performed based on the set exposure amount.

2. The photographing apparatus of claim 1, further comprising:
a dislocation detector for detecting a dislocation between the first and second image signals; and
a combining unit for combining the first and second image signals with each other using the detected dislocation.

3. The photographing apparatus of claim 1, further comprising:
a dislocation detector for detecting a dislocation between the first and second image signals; and
a stereo unit for calculating a stereo image parameter.

4. A photographing apparatus comprising:
a first imaging device for converting light from a subject received through a first optical system into a first electric signal;
a second imaging device for converting light from the subject received through a second optical system into a second electric signal;
a first image signal processor for generating an image signal for a live view based on the first electric signal output from the first imaging device before a photographing operation of a still image;
an exposure controller for controlling an exposure so as to perform a step exposure in the second imaging device before the photographing of the still image;
an exposure calculator for calculating an exposure amount during the photographing operation of the still image based on the second electric signal converted in the second imaging device obtained through the step exposure;
an exposure amount setting unit for setting exposure amounts of the first and second imaging devices to be the same as each other at the same timing based on the calculated exposure amount; and
a second image processor for generating a first image signal for a still image based on the first electric signal converted by the first imaging device and a second image signal for a still image based on the second electric signal converted by the second imaging device at the same time when the photographing operation of the still image is performed based on the set exposure amount.

5. The photographing apparatus of claim 4, further comprising:
a dislocation detector for detecting a dislocation between the first and second image signals; and
a combining unit for combining the first and second image signals with each other using the detected dislocation.

6. The photographing apparatus of claim 4, further comprising:
a dislocation detector for detecting a dislocation between the first and second image signals; and
a stereo unit for calculating a stereo image parameter.

7. A photographing method comprising steps of:
converting light from a subject received through a first optical system into a first electric signal by a first imaging device;
converting light from the subject received through a second optical system into a second electric signal by a second imaging device;
generating an image signal for a live view based on the first electric signal converted by the first imaging device before a photographing operation of a still image;
controlling an exposure to be a step exposure in the second imaging device before the photographing operation of the still image;
calculating an exposure amount required in the photographing operation of the still image based on the second electric signal converted by the second imaging device, which is obtained by the step exposure;
setting an exposure amount of the first or second imaging device based on a highlight reference and an exposure amount of the other imaging devices based on a dark reference at the same time based on the calculated exposure amount; and
generating a first image signal for a still image based on the first electric signal converted by the first imaging device and a second image signal for a still image based on the second electric signal converted by the second imaging device at the same time when the photographing operation of the still image is performed based on the set exposure amount.

8. The photographing method of claim 7, further comprising steps of:
detecting a dislocation between the first and second image signals; and
combining the first and second image signals with each other using the detected dislocation.

9. The photographing method of claim 7, further comprising steps of:
detecting a dislocation between the first and second image signals; and
calculating a stereo image parameter.

10. A photographing method comprising steps of:
- converting light from a subject received through a first optical system into a first electric signal by a first imaging device;
- converting light from the subject received through a second optical system into a second electric signal by a second imaging device;
- generating an image signal for a live view based on the first electric signal converted by the first imaging device before a photographing operation of a still image;
- controlling an exposure to be a step exposure in the second imaging device before the photographing operation of the still image;
- calculating an exposure amount required in the photographing operation of the still image based on the second electric signal converted by the second imaging device, which is obtained by the step exposure;
- setting exposure amounts of the first and second imaging devices to be the same as each other at the same timing based on the calculated exposure amount; and
- generating a first image signal for a still image based on the first electric signal converted by the first imaging device and a second image signal for a still image based on the second electric signal converted by the second imaging device at the same time when the photographing operation of the still image is performed based on the set exposure amount.

11. The photographing method of claim 10, further comprising steps of:
- detecting a dislocation between the first and second image signals; and
- combining the first and second image signals with each other using the detected dislocation.

12. The photographing method of claim 10, further comprising steps of:
- detecting a dislocation between the first and second image signals; and
- calculating a stereo image parameter.

13. A photographing apparatus, comprising:
- means for converting light from a subject received through a first optical system into a first electric signal by a first imaging device;
- means for converting light from the subject received through a second optical system into a second electric signal by a second imaging device;
- means for generating an image signal for a live view based on the first electric signal converted by the first imaging device before a photographing operation of a still image;
- means for controlling an exposure to be a step exposure in the second imaging device before the photographing operation of the still image;
- means for calculating an exposure amount required in the photographing operation of the still image based on the second electric signal converted by the second imaging device, which is obtained by the step exposure;
- means for setting an exposure amount of the first or second imaging device based on a highlight reference and an exposure amount of the other imaging devices based on a dark reference at the same time based on the calculated exposure amount; and
- means for generating a first image signal for a still image based on the first electric signal converted by the first imaging device and a second image signal for a still image based on the second electric signal converted by the second imaging device at the same time when the photographing operation of the still image is performed based on the set exposure amount.

14. The photographing apparatus of claim 13, further comprising:
- means for detecting a dislocation between the first and second image signals; and
- means for combining the first and second image signals with each other using the detected dislocation.

15. The photographing apparatus of claim 13, further comprising:
- means for detecting a dislocation between the first and second image signals; and
- means for calculating a stereo image parameter.

* * * * *